Jan. 26, 1937.  B. SASSEN  2,068,890
AUTOMATIC THREE-DIMENSIONAL PATTERN CONTROLLED MILLING MACHINE
Filed July 10, 1935  4 Sheets-Sheet 3
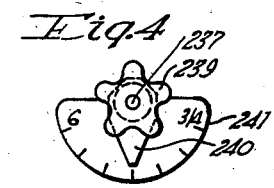
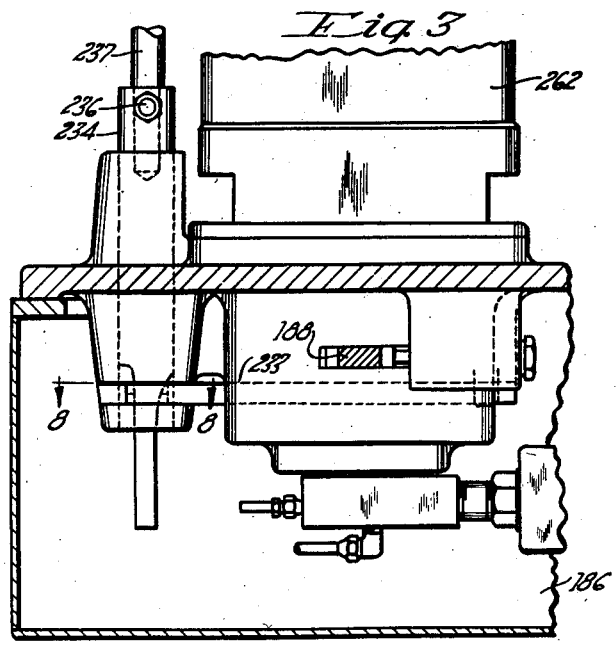
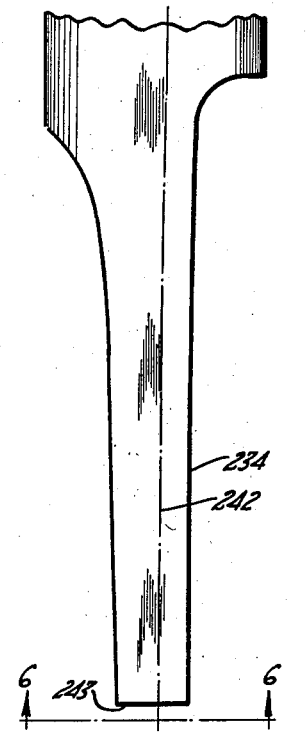
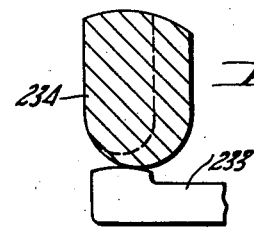
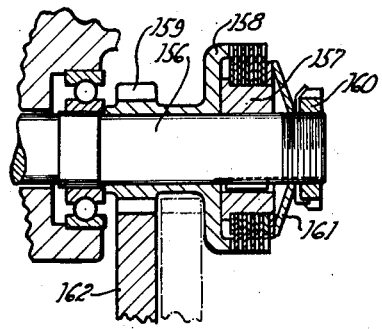
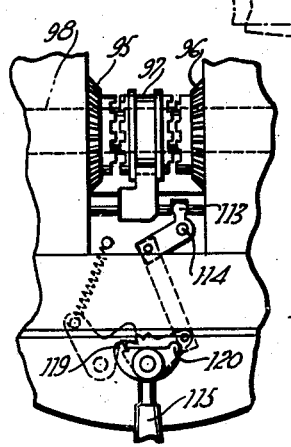
INVENTOR.
BERNARD SASSEN
BY
A.H.K. Parsons
ATTORNEY.

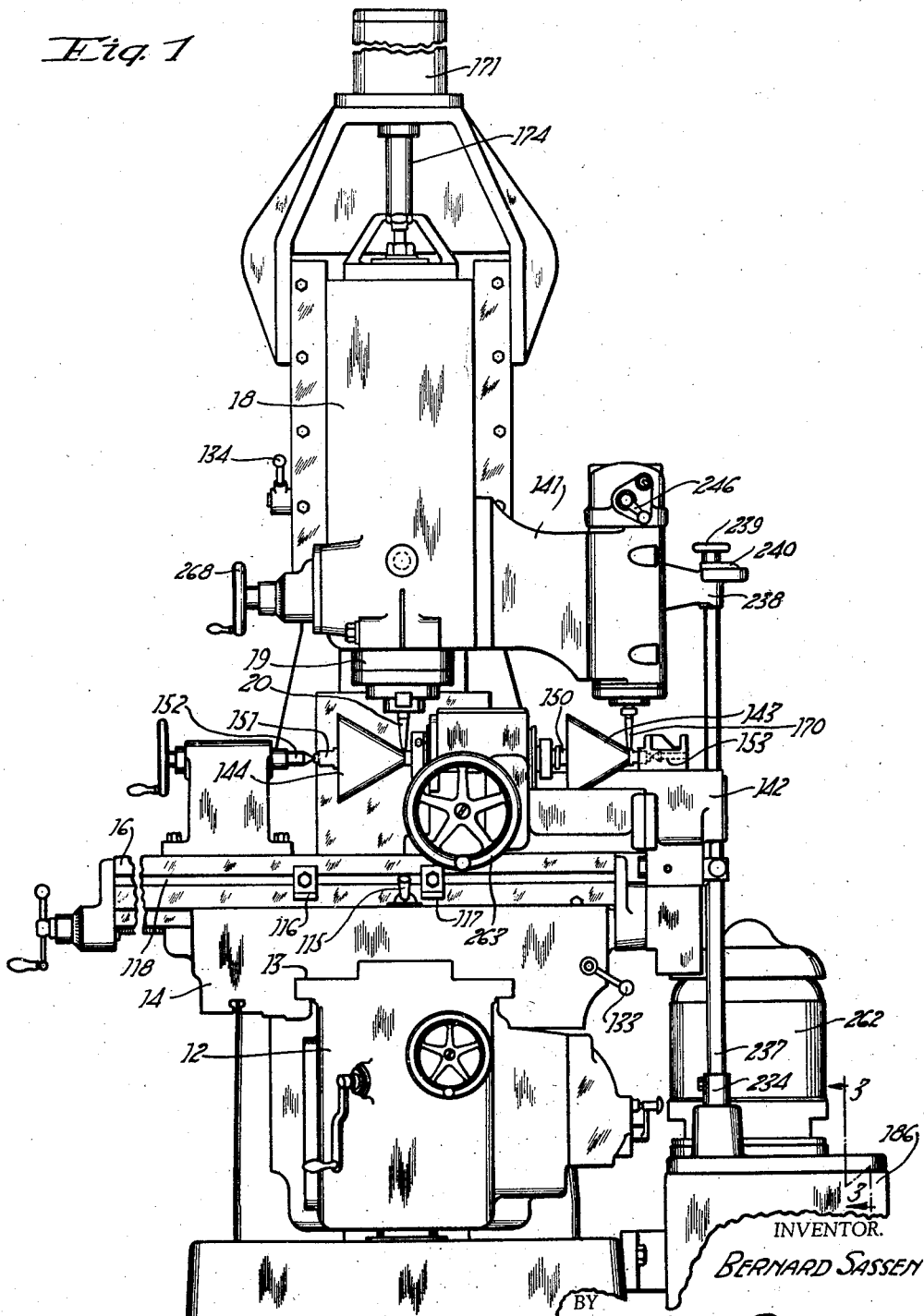

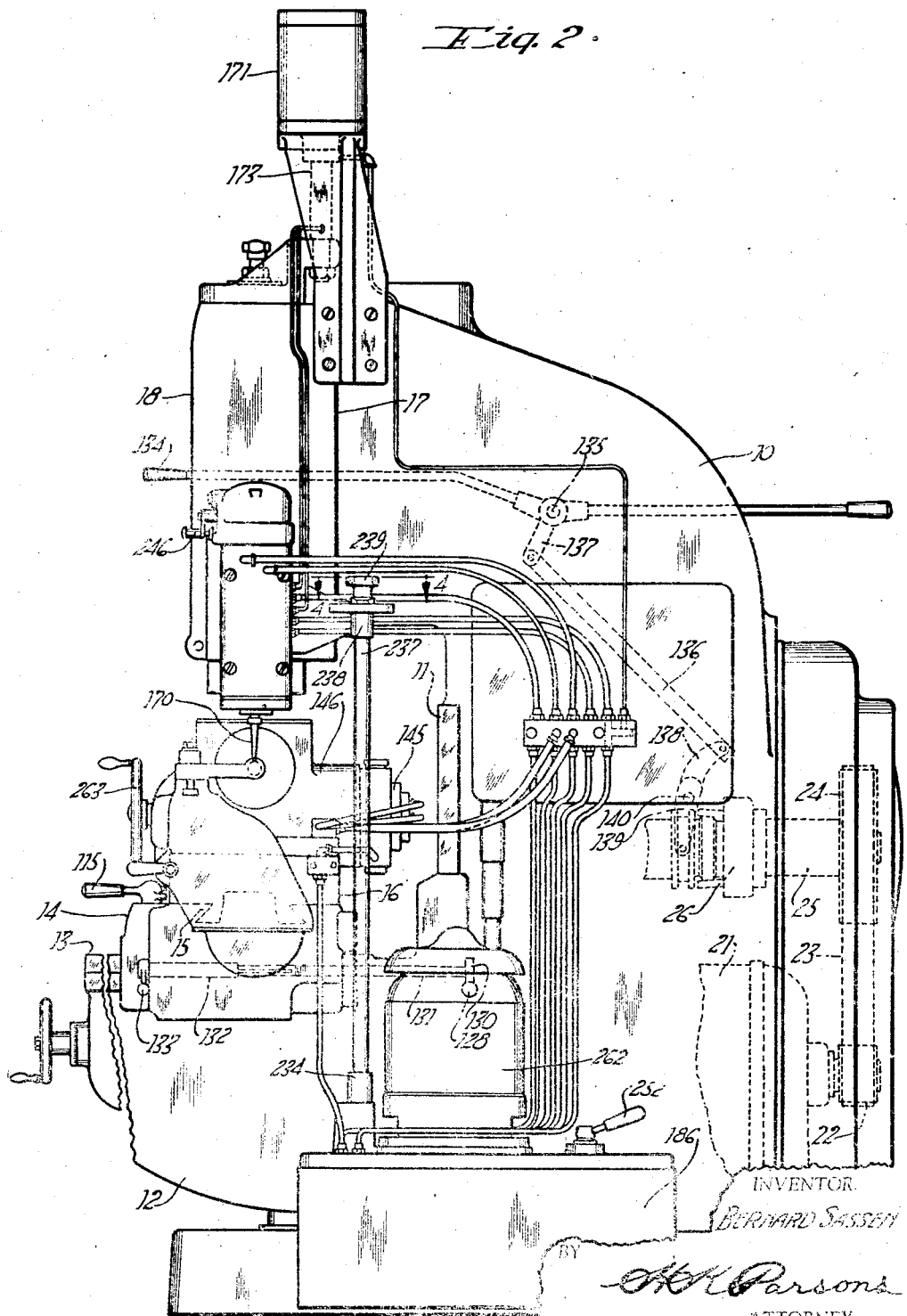

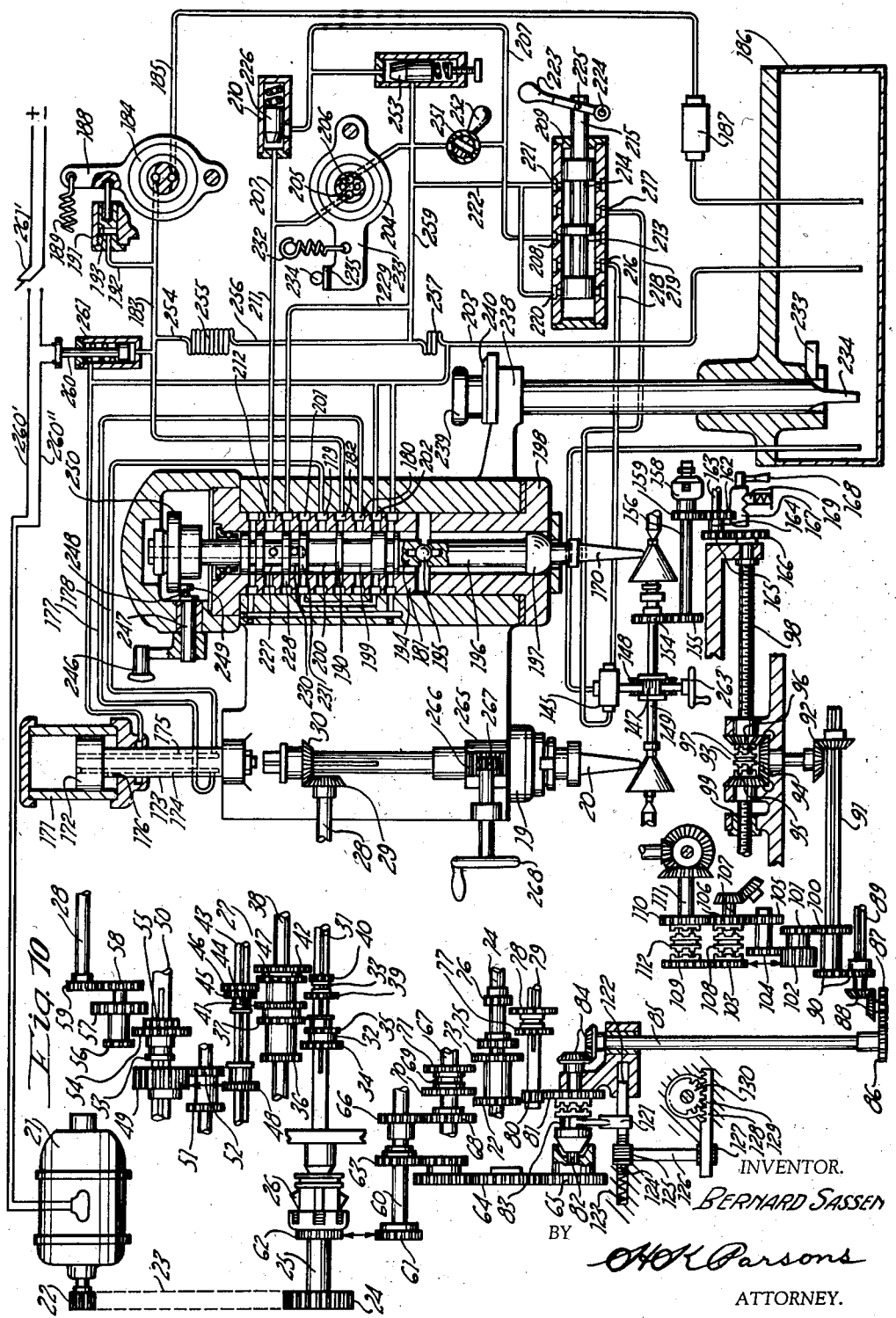

Patented Jan. 26, 1937

2,068,890

UNITED STATES PATENT OFFICE 2,068,890

AUTOMATIC THREE-DIMENSIONAL PATTERN CONTROLLED MILLING MACHINE

Bernard Sassen, Cincinnati, Ohio, assignor to The Cincinnati Milling Machine Co., Cincinnati, Ohio, a corporation of Ohio Application July 10, 1935, Serial No. 30,745

24 Claims. (Cl. 90—13.4)

This invention relates to improvements in duplicating machines of the type wherein a tracer moving with light pressure over a pattern, which may be of relatively soft material, controls an amplified or relatively large force which controls the positioning of a cutter whereby the cutter may form in a work piece of relatively hard material a duplicate of the pattern.

One of the objects of this invention is to produce a mechanism whereby a conventional milling machine may be utilized for automatic duplicating purposes.

Another object of this invention is to provide a universal pattern controlled mechanism which is operable to produce three dimensional objects in a single cycle of the machine.

A further object of this invention is to provide in combination with a mechanism for rotating a work piece with respect to a tool which is movable toward and from the axis of rotation of the work to vary the diameter thereof, of means for maintaining the cutting rate substantially constant regardless of changes in the diameter of the work, and also of providing means rendering it possible to vary the cutting rate.

An additional object of this invention is to provide an improved and simplified hydraulic control circuit for controlling the direction of relative movement between a cutter and work piece automatically and under control of a relatively movable tracer and pattern.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevation of a machine tool embodying the principles of this invention.

Figure 2 is a side view of the machine shown in Figure 1.

Figure 3 is a detailed sectional view taken on the line 3—3 of Figure 1.

Figure 4 is a detail view in plan of the cutting rate control member, as viewed from line 4—4 of Figure 2.

Figure 5 is an enlarged detail view in elevation showing the shape of the cutting rate determinator.

Figure 6 is an end view of the member shown in Figure 5 as viewed along the line 6—6 of that figure.

Figure 7 is a detail view of the mechanism for connecting and disconnecting the table for simultaneous movement in predetermined relation with the rotation of the work.

Figure 8 is an enlarged section of the cutting rate determinator as viewed from line 8—8 of Figure 3.

Figure 9 is a detailed view of the table reversing mechanism.

Figure 10 is a diagrammatic view of the entire transmission and hydraulic control mechanism of the machine.

For exemplary purposes, a conventional milling machine structure is shown in Figures 1 and 2 of the drawings and comprises chiefly a column 10 having vertical guide ways 11 formed upon one face thereof, upon which a knee 12 is vertically slideable. The knee has horizontal guide ways 13 for receiving and guiding a saddle 14 which is adjustable toward and from the face of the column, and the saddle, in turn, has horizontal guide ways 15 upon which is guided a table 16. The column has a second vertical guide way 17 formed on the upper portion thereof for receiving and guiding a spindle carrier 18. This carrier has a cutter spindle 19 journaled therein for rotating a suitably shaped milling cutter 20.

The table, saddle, knee and cutter spindle may be power actuated by any suitable known transmission, and for illustrative purposes one form that this transmission means may take is illustrated diagrammatically in Figure 10 of the drawings. The form illustrated has a common prime mover 21 which, as shown in Figure 2, may be mounted in the rear of the column 10. The drive pulley 22 of this motor may be connected by a suitable power transmitting band 23 to a drive pulley 24 fixed to the end of the main drive shaft 25.

A suitable form of friction clutch 26 may be utilized to connect the main drive shaft to the variable speed transmission 27 which terminates in an output shaft 28 having a bevel gear 29 intermeshing with a bevel gear 30 which is fixed with the column and has a splined connection with the spindle 19 whereby the spindle may be moved vertically with the carrier 18 without breaking the driving connection thereto.

The variable speed transmission consists of a primary shaft 31 upon which is splined two shiftable gear couplets 32 and 33, the former comprising gears 34 and 35 shiftable respectively into mesh with gears 36 and 37 fixed with the secondary shaft 38. The other couplet comprises gears 39 and 40 shiftable into mesh with gears 41 and 42 also fixed with shaft 38 whereby the latter may be driven at anyone of four different speeds.

A tertiary shaft 43 carries a shiftable couplet 44 comprising gears 45 and 46 shiftable respectively into mesh with gears 41 and 47 carried by shaft 38 whereby the shaft 43 may be driven at any one of eight different speeds. The shaft 43 also has a shiftable gear 48 which may be directly meshed with gear 49 for rotating the back gear shaft 50 in one direction, or indirectly connected thereto through the intermediate idler gears 51 and 52 for rotating the shaft 50 in an opposite direction.

This mechanism constitutes a reverser for the tool spindle.

The back gear shaft 50 has the shiftable couplet 53 splined thereon comprising gears 54 and 55 shiftable into engagement with gears 56 and 57 respectively, which gears have integral therewith the gear 58 intermeshing with gear 59 which is fixed with shaft 28. By means of this mechanism it will be seen that the cutter spindle may be rotated at any one of sixteen different speeds and in either a clockwise or counterclockwise direction.

The transmission for shifting the table, saddle and knee consists of a primary shaft 60 which has a gear 61 secured thereto and directly meshing with gear 62 integral with shaft 25, whereby the shaft 60 is continuously rotated during operation of the prime mover 21. This primary shaft actuates a rapid traverse transmission and a variable feed transmission, and has a first gear 63 which is connected by a gear train 64 to the final output gear 65 of the variable speed transmission.

The shaft 60 has a gear 66 which drives the variable feed transmission which may consist of a shaft 67 having a gear 68 intermeshing with gear 66, and a shiftable gear couplet 69, comprising gears 70 and 71 shiftable into mesh respectively with gears 72 and 73, for causing rotation of shaft 74 at different rates. The shaft 74 also has gears 75 and 76 fixed thereto which are adapted to be interengaged by gears 77 and 78 of a second shiftable gear couplet splined on shaft 79, whereby the latter may be rotated at a plurality of different rates. The shaft 79 has gear 80 fixed therewith which drives the final output gear 81 of the feed transmission, this gear being co-axial with gear 65, and both are supported on the final output shaft 82. The gears 65 and 81 may be mounted for free rotation and each provided with means for interconnection with the shiftable clutch member 83 which is splined to the shaft 82 whereby when the clutch member is shifted in one direction the shaft 82 will be rotated at a rapid traverse rate, and when the clutch is shifted in an opposite direction the variable feed transmission will be connected for rotation of shaft 82.

The shaft 82 may be journaled in the column of the machine and connected through bevel gearing 84 and vertical spline shaft 85, to gear 86 carried by the knee 12, whereby as the knee moves up and down, the gear 86 may also move relative to shaft 85 without breaking the driving connection therebetween. The gear 86 drives, through spur gear 87 and bevel gearing 88, the shaft 89 which is interconnected by spur gearing 90 to the spline shaft 91. This shaft may extend parallel to the direction of movement of the saddle, and bevel gearing 92 may be supported in the saddle for movement therewith while maintaining a driving connection with the shaft 91. This bevel gearing serves to drive the reversing mechanism, indicated generally by the reference numeral 93, which serves to change the direction of movement of the table. This reversing mechanism comprises a bevel gear 94 which rotates in opposite directions a pair of bevel gears 95 and 96 having clutch teeth on opposing faces thereof, which are adapted to be selectively interengaged with the shiftable clutch member 97 which is splined on the table lead screw 98. This lead screw passes through a fixed nut 99 which is integral with the saddle 14.

The gear 90 also has integral therewith a gear 100 which drives through spur gear 101 the wide-faced pinion 102 which directly intermeshes with spur gear 103, and indirectly through idler gears 104 and 105 with spur gear 106. The idler gears serve to cause the gear 106 to rotate in a direction opposite to gear 103. The gears 103 and 106 are supported for free rotation on a shaft 107 and are selectively connected thereto by an intermediate shiftable clutch member 108 which serves to change the direction of movement of the saddle to which the shaft 107 is connected.

The gears 103 and 106 also intermesh with gears 109 and 110 mounted for free rotation in the knee drive shaft 111. These gears are selectively connectible to the shaft by an intermediate shiftable clutch member 112. Suitable manual control means may be provided for shifting the clutches 108 and 112 for changing the direction of movement of the saddle or knee, and they are also movable to an intermediate or central position for stopping the movement of the respective supports.

The table reversing control clutch 97 may be manually or automatically shifted by means of the mechanism shown in Figure 9 comprising a shifter fork 113, which is pivotally mounted at 114 and operatively connected to the manual control lever 115. This lever may be utilized to effect engagement of the clutch with either of the bevel gears 95 or 96.

Automatic disengagement may be effected by control dogs 116 and 117 which may be selectively positioned in a conventional manner in the T slot 118 formed in the edge of the table, and these dogs may cooperate with wings 119 and 120 formed integrally with the handle 115 for power rotating the same to a clutch disengaged position.

The feed-rapid traverse selector clutch 83 may be shifted through the following mechanism, comprising a shifter fork 121 secured to shifter rod 122 which is slideably supported in the column and continuously urged in one direction by a spring 123 to normally couple the feed transmission for actuation of the table. The shifter rod 122 has rack teeth 124 interengaged by a pinion 125 secured to a rotatable shaft 126 which has a second pinion 127 on the lower end thereof interengaging with rack teeth formed on the slideable member 128. This interconnecting member has rack teeth 129 formed thereon in 90° phase relation to the first set of rack teeth for interengagement with a pinion 130 held for rotation in the column and integral with a shaft 131. This shaft extends parallel to the direction of movement of saddle 14 and has a splined telescoping connection with an oscillatable tube 132 which is fixed for rotation in the saddle, and therefore movable with respect to the shaft 131. The end of the tubular shaft 132 has a manually operable handle 133 which, when actuated, will compress the spring 123 and effect engagement of the feed-rapid traverse selector clutch 83 with the rapid traverse gear 65. By means of this mechanism it is possible for the operator, when the table control clutch 97 is in one of its power transmitting positions, to procure rapid traverse movement of the table.

The clutch 26, which serves to connect the prime mover with the spindle transmission to start and stop the spindle, may be operatively connected to the control lever 134 pivotally mounted at 135, as shown in Figure 2, by a link 136 which is connected at one end to a crank 137 integral with the lever 134 and a crank 138 integral with the clutch shifter 139, the latter being pivotally mounted for rotation about the pin 140.

The foregoing transmission provides means for starting and stopping the cutter spindle, as well as for rotating it at different rates, together with means for traversing the table at variable feed rates, or at a rapid traverse rate, and control means for selecting either a feed rate or a rapid traverse rate, as well as reversing means for determining the direction of movement of the table.

Detachable means have been provided whereby this machine may be utilized for performing pattern controlled machining operations and comprises, in general, a tracer head indicated generally by the reference numeral 141, Figure 1, which may be detachably connected to the spindle carrier 18 for movement therewith, and a fixture indicated generally by the reference numeral 142 which may be detachably connected to the table for rotatably supporting and driving a pattern 143 and a work piece 144. Power operable means have also been provided under the control of the tracer for causing a relative spiral movement between the work piece and the tool, together with means for moving the carrier 18 toward and from the work piece in accordance with the profile of the pattern whereby a three-dimensional object may be produced, which is in exact conformity with a three-dimensional pattern.

The spiral movement is effected by an hydraulic motor 145 which is contained in the housing 146 of the fixture and operatively connected through a worm 147 and worm gear 148 to a drive shaft 149 which is journaled in the housing, and has means at opposite ends for driving a pattern supporting arbor 150 and a work blank supporting arbor 151. If desirable, dead centers 152 and 153 may be mounted on the table for supporting the free end of these arbors.

The mechanism described so far imparts the rotary component of the spiral movement. The means for effecting the longitudinal component of this movement will now be described.

The shaft 149 drives a gear 154 secured thereto in mesh with spur gear 155 attached to the end of a shaft 156 which extends to the end of the housing 146. As shown in Figure 7, the end of shaft 156 has one member 157 of a friction disc clutch keyed thereto and the other member 158, which is not keyed to the shaft 156, has integral therewith a pinion gear 159. A nut 160 threaded on the end of shaft 156 acts through the spring plate 161 to vary the amount of friction between the friction disc plates, and thereby the point at which slippage will take place between the shaft 156 and the gear 159. The purpose of this will be explained more fully later.

The gear 159 is adapted to be interengaged by a shiftable gear 162 slideably mounted on a shaft 163 which is supported in the fixture 142. The gear 162 has a hub 164 to which may be secured a detachable change gear 165 adapted to intermesh with a change gear 166 detachably mounted on the end of the table lead screw 98. Since the gears 165 and 162 are integral they may be simultaneously shifted by a shifter fork 167 which engages the periphery of gear 162 to break the driving connection between the shaft 156 and the lead screw. The shifter fork may be actuated by the manually operable handle 168 and a suitable spring pressed detent 169 provided for holding the parts in either position.

From the foregoing it will now be seen that the hydraulic motor 145 not only rotates the work and pattern but is also connected for effecting longitudinal movement of the table in predetermined timed relation to the rate of rotation whereby a uniform spiral feeding movement between the tool and work may be effected.

After the cutting operation has been completed the gear unit 162 may be shifted to disconnect the table lead screw from the hydraulic motor 145 and the clutch 97 engaged for power actuation of the table from the prime mover 21, and by engaging the rapid traverse clutch the table may be returned at a rapid traverse rate for the next cutting operation.

During the cutting operation the carrier 18 is moved toward and from the shaft 149 in accordance with the profile of the pattern by means of a servomotor coupled for control by the tracer 170 which engages the pattern 143. The servomotor comprises a cylinder 171 having a contained piston 172 which is operatively connected by the piston rod 173 to the carrier 18. The piston rod has a pair of axially extending channels 174 and 175 formed therein, the end of channel 175 terminating in the space above piston 172, and the channel 174 being connected by a cross bore 176 to the space below the piston 172.

The channels 174 and 175 are connected by pipes 177 and 178 to ports 179 and 180 of the tracer control valve, indicated generally by the reference numeral 181. This valve has a pressure port 182 to which fluid is supplied through a pipe 183 by a pump 184. The pump has an intake pipe 185 through which fluid is withdrawn from a reservoir 186 which is located at the side of the machine as shown in Figures 1 and 2. This pipe may have a strainer 187 serially connected therein for insuring the removal of foreign particles from the oil.

The pump 184 is a variable delivery pump, and has a pendulum 188 which is normally actuated by a spring 189 in a direction to increase the volumetric output of the pump. Since the pressure port 182 is closed a greater part of the time by the spool 190, automatic means have been provided for preventing excessive pressures in the channel 183 and comprise a cylinder 191 which is connected by a branch 192 to the pipe 183. The cylinder 191 has a piston 193 which is operatively connected to the pendulum 188 in such a manner that the pressure in the cylinder acts in a direction against the action of the spring 189 to reduce the delivery of the pump. By calibrating the spring 189 it is possible to maintain a predetermined pressure in the channel 183, and the spring is so calibrated in this case that the pressure is sufficiently high to insure instant and accurate movement of the carrier 18.

The spool 190 is integral with the tracer valve plunger 194 which is supported by the antifriction ball 195 mounted in the end of the tracer arm 196. This tracer arm has a spherical portion 197 by which it is supported for universal movement in the tracer housing 198. The tracer 170 is detachably connected to the end of the tracer arm 196.

When the tracer is in contact with the pattern the tracer arm 196 and the valve plunger 194 are elevated a sufficient amount so that the spool 190 is central of port 182 and thereby no fluid flows from the port to pipes 177 and 178. But should the tracer engage an eminence or a depression on the pattern the spool 190 will be moved upward or downward as the case may be and thereby couple port 182 to either port 179 or port 180. Simultaneous with this connection the annular grooves 199 or 200 formed on opposite sides of the spool 190 will connect either port 179 or port 180 to the return ports 201 or 202 respectively whereby the fluid may escape from one end of the cylinder and be admitted to the other end to cause movement of the carrier 18. The exhaust fluid is returned to the reservoir 186 through the return channel 203.

The hydraulic motor 145 is supplied with fluid from a separate pump 204 which has a delivery port 205 and an intake port 206. The pump 204 is a variable delivery non-reversible pump so that the port 205 is always a pressure port and the port 206 is likewise always a return port.

The port 205 is connected by a channel 207 to port 208 of a reversing valve indicated generally by the reference numeral 209. This channel has a check valve 210 serially connected therein for maintaining a predetermined pressure at the port 205, and in that portion of channel 207 which connects the port to the check valve 210, and also in the branch line 211 which leads to port 212 of the tracer valve.

The port 208 of the reversing valve is adapted to be connected by cannelures 213 and 214 formed in the reversing valve plunger 215 to either port 216 or port 217 to cause reversible operation of motor 145, these ports being connected by channels 218 and 219 respectively to the motor. In other words, when the channel 218 is under pressure, the motor 145 will rotate in one direction and when the channel 219 is under pressure the motor will rotate in an opposite direction.

The reversing valve also has a pair of ports 220 and 221 which are connected to channel 222 which serves to return the fluid to the intake port 206 of the pump 204. In other words, when the pressure port 208 is connected to port 216, port 217 is connected to port 221; and when the port 208 is connected to port 217, the port 216 is connected to port 220 through the cannelure 213. The reversing valve plunger 215 may be shifted by the manually operable handle 223, movable about a pivot 224 and connected by a pin 225 to the plunger 215. From the foregoing it will be seen that the pump 204 and the motor 145 are connected together in a substantially closed circuit in that the pump delivers fluid to the motor and the exhaust fluid from the motor is returned directly to the intake port of the pump.

The tracer valve is so constructed that when the same is shifted by the tracer to cause operation of the hydraulic piston 172 that the branch line 211 is connected to exhaust whereby the pressure at the delivery port 205 of the pump and the connected portion of channel 207 will drop, thereby permitting the plunger 226 of the check valve 210 to move in a direction to throttle momentarily the flow to motor 145 and thereby decrease the rate of rotation of the work during upward or downward adjustment of the carrier 18. This device anticipates the situation that if the tracer engages a shoulder extending longitudinally of the pattern that the tracer valve will be so positioned that a sufficient drop in pressure will occur in channel 207 to cause the check valve plunger 226 to shut off the flow entirely to motor 145, thereby stopping the same and giving the cutter sufficient time to surmount the shoulder before rotation begins again.

The manner in which the tracer valve bypasses the fluid from channel 211 to cause a drop in pressure therein will now be explained. The tracer valve plunger has a cannelure 227 which is normally positioned opposite port 212 and of sufficient width to extend to the edge of port 228. The port 228 is connected by branch 229 to channel 222 and thereby to the intake port 206 of pump. If, now, the tracer valve plunger moves downward, as viewed in Figure 8, port 212 will be connected to port 228, thereby by-passing part of the fluid from pressure port 205 to intake port 206 of pump 204 so that the volumetric delivery to motor 145 is reduced, which decreases the rate of rotation thereof.

The tracer valve plunger has another cannelure 230 which is connected by interdrilling with the cannelure 227 whereby when the plunger is moved upward the cannelure 230 is connected to port 228, thereby again permitting the pressure fluid from channel 211 to be by-passed into channel 229. Attention is invited to the fact that the spool 231, which separates the cannelure 230 from the cannelure 200, has sufficient overlap on the upper side of port 201 so that when the tracer valve moves downward to connect port 212 with port 228 that the cannelure 230 is not interconnected to the exhaust port 201.

It will now be seen that the tracer valve has one portion which serves as part of the servomotor mechanism for controlling the vertical position of the spindle carrier 18 and that the servomotor mechanism is supplied from a first pump; and has a second portion which serves as a control for by-passing fluid from a second supply pump which supplies the motor 145 to thereby reduce the rate of spiral feed movement of the work relative to the cutter whenever the servomotor mechanism is operated.

As previously stated, the pump 204 is a unidirectional variable delivery pump and a spring 232 is connected to the pendulum 233 of the pump which acts in a direction to decrease the volumetric delivery of the pump. Adjustable means have been provided for limiting the action of the spring and comprises a peculiarly shaped stop member 234 which engages a curved surface 235 formed on the pendulum 233. The particular shape of the member 234 is shown more particularly in Figures 5 and 6. The member 234 is connected by a clamping bolt 236 to a control rod 237 which extends upward, as shown in Figures 1 and 2, and passes through a boss 238 formed integral with the bracket 141. Furthermore, the rod 237 is fixed against longitudinal movement with respect to the bracket 238 whereby upon upward or downward movement of the spindle carrier 18 the rod 237 will be moved therewith. The upper end of the rod has an operating knob 239 and also has integral therewith, as more particularly shown in Figure 4, a pointer 240 which is movable upon rotation of the rod 237 over a graduated plate 241 which has suitable markings to indicate inches of relative feed movement between the work and tool.

The member 234 rotates about the axis 242 indicated by the dash and dot line in Figure 5, and it will be noted from Figure 6 that the end face 243 is so shaped, that the curved portion 244, which is substantially a semi-circular, is eccentric to the axis 242 whereby rotation of the member 234 in a counter-clockwise direction will force the pendulum 233, indicated in dash and dot lines in Figure 6, in a direction away from the center 242 which will increase the displacement of the variable delivery pump 204 and thereby increase the actual cutting rate; and rotation of member 234 in a clockwise direction will permit the spring 232 to move the pendulum toward the center 242 and decrease the actual cutting rate. The true relationship of the parts is shown in Figure 8, from which it will be seen that as the pointer 240 moves in a clockwise direction, that the member 234 in Figure 8 will rotate in a clockwise direction and thereby increase the feed rate.

In addition to determine the feed rate the member 234 also serves to maintain this feed or cutting rate constant in spite of variations in the diameter of the work and for that reason the rod 237 was fixed for movement with the carrier 18 so that as the same is caused to move upward by the cone-shaped pattern 143, the rod 237 and member 234 will also move upward, and as they move upward the member 234 is so shaped longitudinally as to decrease the displacement of the pump and thereby slow down the rate of rotation whereby the cutting rate will remain the same because the diameter of the work and pattern has increased. In other words, when the tracer and cutter are in the position shown in Figure 1 and riding upon substantially the smallest diameter of the work, the pendulum 233 crosses the member 234 at a point where it is held in the position indicated by the dash and dot line 245, which thereby sets the pump displacement to yield a cutting rate of ¾" a minute for the substantially minimum diameter shown.

It will be noted from Figure 6 that beginning at each point on the semi-circumference 244 the side of the member 234 gradually curves outward as the surface progresses upwardly, and therefore as the member 234 rises and the radial distance to the curved surface decreases the pendulum 233 is moved toward the axis 242 by spring 232 to decrease the volumetric displacement of the pump. Therefore, regardless of the rotatable setting of the member 234 the element of the surface which lies in a vertical plane and passes through the point of contact betwen the surface of the member 234 and the end of the pendulum is so shaped as to maintain a uniform change in feed rate as the diameter of the pattern changes. Therefore, the member 234 has circumferentially extending cam portions which serve as a selector for the cutting rate and axially extending cam portions which maintain that rate constant regardless of change in the diameter of the pattern.

After the pattern has been reproduced the tracer may be lifted out of contact with the pattern by means of the manually rotatable handle 246 fixed with shaft 247 which carries at its inner end a crank arm 248 having a roller 249 on the end thereof, engaging the underside of a peripheral flange 250 formed integrally with the top of the tracer valve. When the valve is lifted in this manner the port 182 is connected to the port 180, which thereby admits fluid to the lower end of cylinder 171 causing upward movement of the carrier 18. This also opens the by-pass of pump 204 to such an extent that when the check valve 226 closes, rotation of the motor 145 ceases. This makes it possible to shift the gear 162 out of engagement with gear 159 whereby the table may be returned at rapid traverse to a starting position by the means heretofore described.

A valve 251, having a manually operable handle 252, has also been provided across pump 204 to short circuit the motor 145 and thereby stop the rotation thereof in spite of any position that the tracer controlled valve may be in.

An emergency relief valve 253 has also been provided in parallel with the valve 251 whereby in case of emergency, causing excessive pressure to build up in channel 207, the same may be relieved through the relief valve without causing damage to the system.

The pump 184 is also utilized to serve as a booster pump for the independent circuit to motor 145, and to this end has a branch line 254 which is connected to a fluid resistance 255 which causes a drop in pressure to the outlet line 256. This line is connected by a second fluid resistance 257 to the return channel 203. By properly selecting resistances 255 and 257 a predetermined pressure may be maintained in channel 256 and this channel may be connected by a branch 259 to the return channel 222 of pump 204 whereby the return channel and its pump will always be supercharged at a predetermined pressure.

An additional safety means has been provided in the form of a fluid operable switch 260 connected in one of the electrical mains 260' or 260" after the main switch 261' which has a cylinder 261 connected to the output line 183 of pump 184, whereby if for any reason this pump is not operating, it will be impossible to start the main prime mover 21 of the transmission mechanism, which is supplied with current from these mains. This insures that the operator will have the motor 262, which drives pumps 184 and 204, running before it will be possible to start the prime mover 21.

A hand wheel 263 may be provided on the end of shaft 264 which supports the worm 147 whereby when the hydraulic motor 145 is stopped it is possible for the operator to manually rotate the work and pattern, and if the gear 162 is interengaged with the gear 159, a relative spiral movement between the tool and work will result.

The friction clutch 158 serves as a safety means to prevent damage to the parts in case the operator should engage the reverser clutch 93 while the hydraulic power is still operating the motor 145.

For set-up purposes the cutter spindle may be supported in an adjustable quill 265, having rack teeth 266 cut in the periphery and interengaged by a pinion 267 operated by a handwheel 268 in the usual manner of such devices.

There has thus been provided an improved machine for reproducing three-dimensional objects which is simple in construction, easy to operate and which automatically maintains a substantially constant cutting rate.

I claim:

1. In a pattern controlled machine tool, the combination of a support capable of rectilinear movement, means thereon supporting a work blank and a pattern for rotary movement, power operable means for simultaneously effecting said movements in predetermined timed relation, a cutter supported for movement toward and from said support, and a tracer adapted to follow the profile of the pattern and operatively connected for automatically governing the movement of said cutter, and said power operable means.

2. A pattern controlled machine tool having a rotary support to which a work blank and a pattern may be mounted for rotation, a cutter movable in the plane of the axis, of rotation of the rotary support for shaping the work blank, a power operable motor for effecting rotation of said support and a bodily longitudinal movement thereof, a second power operable motor for moving the cutter, and a tracer supported for movement with the cutter and having means associated therewith during engagement with the pattern for controlling actuation of said motors in a manner to produce a three-dimensional cutting path.

3. In a pattern controlled machine tool, the combination of a movable support having a cutter and tracer mounted thereon, a reciprocable support having means for rotatably supporting a work blank and a pattern, power means controlled by the tracer while in contact with the pattern to cause a relative traversing movement between the supports to effect a contouring operation, manually operating means for separating the tracer from the pattern and simultaneously effecting a power separation between the cutter and work, and means for returning the reciprocable support to a starting position.

4. In a machine tool having a rotatable work support and a reciprocable tool slide movable toward and from the axis of rotation of the work support, the combination of power operable means for rotating the work support, power means for moving the tool support toward and from the work support during rotation of the latter, and means connected to the tool support and responsive to movement thereof to automatically vary the rate of rotation of the work support.

5. In a machine tool having a rotatable work support, a tool support power movable toward and from the axis of the work support, the combination of fluid operable means including a supply channel for effecting rotation of the work support, and means connected to the tool support and responsive to movement thereof to vary the rate of fluid flow in said channel and thereby the rate of rotation of the work support.

6. In a machine tool having a rotatable work support and a tool support movable toward and from the axis of the work support, the combination of fluid operable means for effecting rotation of the work support including a variable delivery pump, and means responsive to movement of the tool support for varying the volumetric delivery of said pump and thereby the rate of rotation of the work support.

7. In a machine tool having a reciprocating support, a rotatable work holder carried thereby, and a cutter support movable relative to the work holder, of power operable means for rotating the work holder and reciprocating the first-named support in predetermined timed relation to one another to effect a relative feeding movement with respect to the cutter support, means to move the cutter support toward and from the first-named support to vary the size of the work, and means responsive to movement of the cutter support to vary the rate of movement of the work holder and thereby maintain a constant rate of cutting.

8. In a machine tool having a rotatable work support and a cutter support movable toward and from the axis of rotation of the work support, the combination of power operable means for effecting rotation of the work support, power operable means for moving the cutter support toward and from the work support during rotation thereof to vary the diameter of the work, a cutting rate determinator having a circumferentially extending cam portion for predetermining the rate of cutting, and additional cam portions lying normal to the plane of said circumferential portion and responsive to movement of the cutter support for varying the rate of rotation of the work support in accordance with movement of the tool support to maintain said predetermined cutting rate constant.

9. In a machine tool having a rotatable work support and a tool support, the combination of power operable means for effecting a relative movement of one support toward and from the other, fluid operable means for effecting rotation of the work support including a variable delivery pump, a rotatable and axial movable cutting rate determinator, manually operable means for rotating said determinator, means to connect said determinator for axial movement in response to said relative movement between the supports, a circumferentially extending cam portion on the determinator effective upon rotation thereof for differently positioning the displacement regulator of the pump and thus selecting a predetermined cutting rate, and other cam portions on said determinator effective during axial movement thereof for automatically adjusting the displacement of said pump to maintain the rate of cutting constant.

10. In a machine tool having a rotatable work support and a tool support, the combination of power operable means for effecting a relative movement of one support toward and from the other, fluid operable means for effecting rotation of the work support including a variable delivery pump, a rotatable and axial movable cutting rate determinator, manually operable means for rotating said determinator, means to connect said determinator for axial movement in response to said relative movement between the supports, a circumferentially extending cam portion on the determinator effective upon rotation thereof for differently positioning the displacement regulator of the pump and thus selecting a predetermined cutting rate, other cam portions on said determinator effective during axial movement thereof for automatically adjusting the displacement of said pump to maintain the rate of cutting constant, and means associated with said determinator for indicating the predetermined rate of cutting for each setting thereof.

11. In a pattern controlled machine tool, the combination of a table for supporting a work blank and a pattern, a carrier mounted for relative movement with respect to said table, means to support a cutting tool and a tracer on said carrier, a fluid operable carrier motor having a pair of ports through which fluid may be introduced to effect opposite movement of the carrier, fluid operable means for effecting a relative feeding movement between the table and carrier including a supply line, means controlled by the tracer while in contact with the pattern for controlling the introduction of fluid to said ports, and additional means controlled by the tracer to by-pass fluid from said supply line when positioned to introduce fluid to said ports.

12. In a pattern controlled machine tool having a work and pattern support and a cutter and tracer support, the combination of separate fluid operable motors for moving said supports, a pump having intake and delivery ports connected to one of said motors, a servo-control valve for determining flow to the other motor, means coupling said servo-control valve for actuation by the tracer in response to movement by the pattern, and additional means responsive to movement of the tracer for variably by-passing fluid from said pump supply port to exhaust.

13. In a pattern controlled machine tool having a work support and a tool support, the combination with means on one of said supports for receiving a pattern and means on the other support for supporting a tracer in engagement with the pattern, of fluid operable means for moving the tool support toward and from the work support, additional fluid operable means for effecting a relative feeding movement between the supports including a pump, a motor, a supply line extending from the pump to the motor, valve means operatively connected to the tracer for controlling the admission and exhaust of fluid to the first-named fluid operable means, a branch line from said supply line, and valve means controlled by the tracer for opening said branch line to exhaust whenever the first-named valve means is positioned to cause admission of fluid to said fluid operable means for the tool slide.

14. In a pattern controlled machine tool having a work support, a cutter support, means for supporting a pattern on one of said supports, and means for supporting a tracer on the other support, the combination of a first fluid operable motor connected for effecting a relative feeding movement between the supports, a second fluid operable motor for bodily adjusting one of said supports with respect to the other, a pump connected in a substantially closed circuit to the first motor, a separate source of fluid supply for the second motor, means controlled by the tracer for governing the flow to said second motor, and additional means controlled by the tracer when moved by the pattern to a position causing admission of fluid to said second motor to open said closed circuit whereby the feeding rate will be reduced during said bodily adjustment.

15. In a pattern controlled machine tool having a reciprocating table, a rotatable head carried by the table having means for supporting and rotating a work blank and a pattern, a carrier movable toward and from the table; a cutter and a tracer supported by said carrier; a fluid operable motor for effecting simultaneously rotation of said head and movement of said table in predetermined timed relation to effect a spiral cutting path, a pump for supplying fluid to said motor, a second fluid operable motor for moving said carrier, a separate source of supply for the last-named motor, means governed by the tracer for determining the rate of volumetric flow to each of said motors, and means between said pump and work head motor for changing the direction of rotation of the motor and thereby the hand of said spiral cutting movement.

16. In a pattern controlled machine tool having a work support and a cutter support and means for supporting a pattern and tracer on the respective supports, of power operable means for effecting a relative feeding movement between the supports, a fluid operable motor including a servo-control valve connected for actuation by the tracer for adjusting one slide with respect to the other during said feeding movement, a pump for supplying fluid pressure to said servo-valve, and means for automatically reducing the displacement of said pump when said servo-valve is closed.

17. A pattern controlled machine tool having a work support, a tool support, means to support a tracer and a pattern on the respective supports, fluid operable means for effecting a relative feeding movement between the supports including a supply pump, delivery and return lines connecting the pump to the motor, a second fluid operable means for effecting a relative reciprocating movement of one support toward and from the other, an additional pump for supplying fluid to said second-named fluid operable means, means governed by the tracer for controlling said supply, a branch line from the second pump having serially arranged fluid resistances therein, and means connecting said return line to a point intermediate said resistances for maintaining a predetermined pressure in said return line.

18. A pattern controlled machine tool having a work support; a tool support; means for supporting a pattern and a tracer on the respective supports; a fluid operable motor for effecting a relative feeding movement between the supports therefor, a supply line therefor, fluid operable means for effecting reciprocation of one of said supports toward and from the other, a tracer controlled valve having a central position for shutting off flow to said fluid operable means, a check valve in the supply line to said motor, a branch line between said pump and check valve and connected to said tracer control valve, and portions on said tracer controlled valve for opening said branch line upon movement from its central position, said check valve being positioned to close when said branch line is opened to thereby insure positive reduction in the volumetric supply to said motor.

19. In a pattern controlled machine tool, the combination with a work support and a spindle carrier having a tool spindle journaled therein, of transmission means including a prime mover and a variable speed transmission for actuating said spindle; fluid operable means for moving the spindle carrier toward and from the work support, a pump for supplying fluid to said fluid operable means, a pair of power means including a main switch for controlling the prime mover, an auxiliary switch between the main switch and the prime mover, and means responsive to fluid pressure from said pump for closing said auxiliary switch whereby the spindle can only be rotated if there is fluid pressure to supply said fluid operable means.

20. In a pattern controlled machine tool having a reciprocable table and a slide movable in a plane normal to the axis of reciprocation of the table, the combination of means on the table for rotating a work blank and a pattern, a tool and a tracer carried by said slide, a fluid operable device for rotating the work and pattern and reciprocating said table, means to supply fluid under pressure to said fluid operable device, a valve for terminating fluid flow to said device, and a hand wheel for rotating the work and reciprocating said table when said flow is terminated.

21. In a pattern controlled machine tool having a table, an actuator therefor, a rotatable support carried by the table, a fluid operable motor for rotating said support, transmission means coupling the motor to the table actuator, a cutter and tracer supported in operative engagement with the work and pattern, means controlled by the tracer for governing operation of the motor and thereby effecting a relative feeding movement between the tool and work, an additional power operable means for actuating the table actuator, and a safety clutch between the actuator and motor to prevent rotation of the work by the table actuator when the same is connected to said additional source of power.

22. Means for converting a vertical type milling machine for profiling purposes comprising a rotatable head attachable to the table of said machine and having means for rotating a work piece and a pattern, a tracer head adapted to be attached to the vertical slide of the machine, a fluid operable motor in the first-named head for rotating the work and pattern, fluid operable means for reciprocating the vertical slide of the machine, and means controlled by the tracer in response to the pattern for governing the actuation of said motors.

23. In a pattern controlled machine tool having a table, an actuator therefor, a rotatable support carried by the table, fluid operable means for rotating said support, transmission means coupling the fluid operable means to said actuator, a cutter and tracer supported for operative engagement with the work and pattern, and means controlled by the tracer for governing actuation of said fluid operable means and thereby relative movement between the tool and work whereby a three-dimensional work piece may be produced in a single operation.

24. In a pattern controlled machine tool, the combination of a movable support having a cutter and a tracer mounted thereon, a reciprocable support having means for supporting a work blank and a pattern, power operable means controlled by the tracer while in contact with the pattern to cause movement of each support and thereby determine two dimensions of the work piece, and additional means operated by said power means to effect an additional relative movement between the supports and simultaneously with the other movements to determine a third dimension of said work piece.

BERNARD SASSEN.